United States Patent Office 3,460,171
Patented Aug. 12, 1969

3,460,171
PROCESS FOR THE CONTINUOUS DYEING OF ARTICLES MADE FROM POLYACRYLONITRILE FIBERS WITH CATIONIC DYESTUFFS
Walter Hees, Cologne-Hohenberg, Germany, assignor to Farbenfabriken Bayer Aktiengesellschaft, Leverkusen, Germany, a corporation of Germany
No Drawing. Filed May 13, 1966, Ser. No. 549,801
Claims priority, application Germany, May 19, 1965, F 46,084
Int. Cl. D06p 1/68, 3/00; C09b 67/00
U.S. Cl. 8—169     9 Claims

ABSTRACT OF THE DISCLOSURE

A process for continuous dyeing of polyacrylonitrile materials and fibers with cationic dyestuffs padded in the presence of a mixture prepared from
(1) Esters of polyhydric aliphatic alcohols with lower aliphatic carboxylic acids, and
(2) From the reaction product of alkylene oxide with aliphatic or aromatic compounds containing active hydrogen atoms.

---

The present invention relates to a process for the continuous dyeing of articles made from polyacrylonitrile fibers with cationic dyestuffs by padding and fixing the dyestuffs on the materials with steam or dry heat. According to the invention this process is carried out by padding the dyestuffs in the presence of a mixture which is prepared from esters of polyhydric aliphatic alcohols with lower aliphatic carboxylic acids and from reaction products of alkylene oxides with aliphatic or aromatic compounds containing active hydrogen atoms.

Esters of polyhydric aliphatic alcohols with lower aliphatic carboxylic acids are, for example, the mono- and diesters of ethylene glycol or diethylene glycol and also the mono-, di- and triesters of glycerol, trimethylol propane or hexanetriol with acetic acid.

Suitable alkylene oxide reaction products are, for example, the products which can be obtained by the reaction of ethylene oxide and/or propylene oxide with aliphatic alcohols, such as trimethylol propane, stearyl alcohol and oleyl alcohol; with higher fatty acids, such as oleic acid; and with alkyl or aryl phenols, such as nonyl phenol and hexadecylaminomethyl phenol or benzylhydroxydiphenyl, in a molar ratio of 6 to 100:1.

The proportion of the esters to the alkylene oxide reaction products can vary within wide limits; in general, it is advantageous to use 50 to 30 parts by weight of alkyleneoxide reaction products per 50 to 70 parts by weight of ester. The necessary quantities of the mixture to be used according to the invention may readily be ascertained by preliminary experiments. In general, amounts of 30 to 70 g. per each liter of padding liquor are sufficient.

With the aid of the process according to the present invention it is possible to dye continuously articles of polyacrylonitrile fibers, e.g., cable sheathing, combed materials, fabrics or knitted goods, in a short time and in even and deep shades.

The following examples serve to illustrate the invention without, however, limiting its scope.

EXAMPLE 1

A combed material of polyacrylonitrile fibers is impregnated on the foulard with a liquor heated to 40° C. and containing, per liter, 20 g. of the dyestuff obtained by diazotizing 1-amino-4-methoxybenzene and coupling with 1,3,3-trimethyl-2-methylene-indoline; the product being thereafter converted into the azo form by treatment with a sodium carbonate solution in an aqueous suspension; 15 g. glacial acetic acid, 15 g. glyceroltriacetate, 3 g. of the reaction product of 95 mols ethylene oxide with 1 mol trimethylol propane, 12 g. of the reaction product of 7 mols ethylene oxide with 1 mol nonyl phenol, and 1 g. carob bean flour as thickening agent. The combed material is squeezed to a weight increase of about 100%, then steamed for 20 minutes at a temperature of 100–104° C., subsequently rinsed and dried. A full and fast golden-yellow dyeing is obtained.

EXAMPLE 2

The procedure is the same as that described in Example 1, but there is used for impregnating a liquor which contains, per liter, 40 g. of the dyestuff indicated in Example 1, 15 g. glacial acetic acid, 20 g. glyceroltriacetate, 14 g. of the reaction product of 7 mols ethylene oxide with 1 mol nonyl phenol, and 6 g. of the reaction product of 6 mols ethylene oxide with 1 mol oleic acid. Full and fast golden yellow dyeings are thus also obtained.

EXAMPLE 3

A cable sheathing of polyacrylonitrile fibers is impregnated on the foulard with a liquor heated to 40° C. and containing, per liter, 30 g. of the dyestuff according to Example 6 of U.S. Patent No. 3,347,865; 15 g. glacial acetic acid, 15 g. glyceroltriacetate, 10 g. of the reaction product of 7 mols ethylene oxide with 1 mol nonyl phenol, 5 g. of the reaction product of 6 mols ethylene oxide with 1 mol oleic acid, and 1 g. carob bean flour as thickening agent. The cable sheathings are then squeezed to a weight increase of about 100%, steamed at 104° C. for 30 minutes, then rinsed and dried. A fast, reddish blue dyeing is obtained.

EXAMPLE 4

A fabric of polyacrylonitrile fibers is impregnated on the foulard with a liquor heated to 70° C. and containing per liter, 25 g. of the dyestuff according to Example 2 of U.S. patent specification No. 3,122,517, 9 g. of the dyestuff obtained by quaternization of 1-(γ-dimethylaminopropyl)amino-4-(p-tolyl)aminoanthraquinone with dimethyl sulphate, 3 g. glacial acetic acid, 15 g. glyceroltriacetate, 10 g. of the reaction product of 7 mols ethylene oxide with 1 mol nonyl phenol, 5 g. of the reaction product of 6 mols ethylene oxide with 1 mol oleic acid, and 2 g. carob bean flour as thickening agent. The fabric is then squeezed to a weight increase of about 90%, continuously heated at about 100° C. in an infrared radiation area and allowed to stand, in a batched state, at 100° C. for 2 hours, in a steam atmosphere and in a closed chamber. After drying, the fabric exhibits a fast green dyeing.

EXAMPLE 5

A fabric of polyacrylonitrile fibers is impregnated on the foulard with a liquor heated to 40° C. and containing, per liter, 20 g. of the dyestuff produced by diazotizing 1-amino-4-methyl-benzene and coupling with 1,3,3,-trimethyl-2-methylene indoline; the resulting compound being converted into the azo form by treatment with a sodium carbonate solution in an aqueous suspension; 15 g. glacial acetic acid, 20 g. glycerol monoacetate, 10 g. glycerol triacetate, 5 g. of the reaction product of 14 mol ethylene oxide with 1 mol hexadecylaminoethyl phenol, 15 g. of the reaction product of 6 mols ethylene oxide with 1 mol oleic acid, and 3 g. carob bean flour as thickening agent. The fabric is then squeezed to a weight increase of about 90%, then dried and subsequently subjected at 190° C. for 60 seconds to a hot air treatment. After rinsing and drying, the fabric exhibits a fast yellow dyeing.

EXAMPLE 6

A mixed fabric consisting to 60% of polyacrylonitrile fibers and to 40% of copper spun rayon is impregnated on the foulard with a liquor, described below, heated to 70° C. and containing a cationic dyestuff suitable for dyeing the polyacrylonitrile fibers and a substantive dyestuff suitable for dyeing the cellulose fibers; the fabric is then squeezed to a weight increase of about 50%, then continuously heated at about 100° C in an infrared radiation area and subsequently allowed to remain. in a batched state, at 100° C. for 3 hours in the steam atmosphere of a closed chamber. The polyacrylonitrile fibers of the fabric are then dyed in a blue shade while the copper spun rayon fibers are dyed in a red shade.

The dye liquor used was prepared in the following manner: 20 g. of the dyestuff, Colour Index, 2nd edition, No. 51005, were pasted by means of a mixture of 10 g. glycerol triacetate, 5 g. ethylene glycol-diacetate, 10 g. of the reaction product of 12 mol ethylene oxide with 1 mol ortho-benzylhydroxydiphenyl and 10 g. water; this paste was then dissolved in 450 ml. boiling hot water. The solution was mixed while continuously stirring, with a solution prepared from 500 ml. boiling water, 10 g. of a condensation product of 2 mols β-naphthalene-sulphonic acid with 1 mol formaldehyde, and 20 g. of the dyestuff produced by coupling diazotized 1-amino-2-methoxybenzene-5-carboxylic acid with the asymmetric urea obtained from 2-amino-5-hydroxynaphthalene-7-sulphonic acid and the phenyl urethane of the monoazo compound 1-amino-8-hydroxynaphthalene-3,6-disulphonic acid→cresidine.

I claim:
1. A dyeing liquor containing a cationic dyestuff and an active amount of leveling mixture consisting essentially of
   (a) an ester of a polyhydric aliphatic alcohol and a lower aliphatic carboxylic acid, and
   (b) the reaction product of an alkylene oxide with an aliphatic or aromatic compound containing active hydrogen atoms; the ratio of (a) to (b) being about 50–70:50–30 parts by weight of the mixture.
2. The liquor of claim 1 wherein
   (a) is the acetic acid ester of ethylene glycol, diethylene glycol, trimethylol propane of hexanetriol, and
   (b) is the reaction product of an alkylene oxide of 2–3 carbon atoms with an aliphatic or aromatic alcohol, the molar ratio of alkylene oxide to alcohol being about 6–100:1.
3. The liquor of claim 2 containing about 3–7% by weight of leveling mixture.
4. The liquor of claim 2 wherein the leveling mixture consists essentially of about 1.5% by weight glacial acetic acid, 1.5% by weight glycerol triacetate, .3% by weight of the reaction product of about 95 mols ethylene oxide with 1 mol trimethylol propane, and 1.2% by weight of the reaction product of about 7 mols ethylene oxide with 1 mol nonyl phenol.
5. The liquor of claim 2 wherein the leveling mixture consists essentially of about 1.5% by weight glacial acetic acid, 2% glycerol triacetate, 1.4% of the reaction product of about 7 mols ethylene oxide with 1 mol nonyl phenol, and 6% by weight of the reaction product of about 6 mols ethylene oxide and 1 mol oleic acid.
6. The liquor of claim 2 wherein the leveling mixture consists essentially of about 1.5% by weight glacial acetic acid, 2% glycerol monoacetate, 1% glycerol triacetate, .5% of the reaction product of about 14 mols ethylene oxide with 1 mol hexadecylaminomethyl phenol, 1.5% of the reaction product of about 6 mols ethylene oxide with 1 mol oleic acid.
7. The liquor of claim 2 wherein the leveling mixture consists essentially of an aqueous solution of about 1% by weight glycerol triacetate, .5% ethylene glycol diacetate, 1% of the reaction product of about 12 mols ethylene oxide with 1 mol ortho-benzylhydroxydiphenyl.
8. A process for dyeing of articles of polyacrylonitrile with cationic dyestuffs comprising padding the articles with the dyeing liquor of claim 1, and fixing the dyestuff.
9. A process for continuous dyeing of articles of polyacrylonitrile fibers with cationic dyestuffs comprising padding the articles with the dyeing liquor of claim 3, and fixing the dyestuff on the fibers.

References Cited
UNITED STATES PATENTS

| | | | |
|---|---|---|---|
| 2,764,466 | 9/1956 | Bigood | 8—55 |
| 3,085,848 | 4/1963 | Hinton | 8—55 |
| 3,346,322 | 10/1967 | Finkenauer | 8—55 |

NORMAN G. TORCHIN, Primary Examiner

J. E. CALLAGHAN, Assistant Examiner

U.S. Cl. X.R.

8—88, 92, 173, 177